(12) United States Patent
Alawneh

(10) Patent No.: US 10,734,753 B1
(45) Date of Patent: Aug. 4, 2020

(54) CONTACT SPLICE

(71) Applicant: ITT MANUFACTURING ENTERPRISES LLC, Wilmington, DE (US)

(72) Inventor: Ehab Alawneh, Oceanside, CA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

(21) Appl. No.: 16/381,286

(22) Filed: Apr. 11, 2019

(51) Int. Cl.
| | |
|---|---|
| *H01R 4/00* | (2006.01) |
| *H01R 13/52* | (2006.01) |
| *H02G 1/14* | (2006.01) |
| *H01R 13/11* | (2006.01) |
| *H01R 13/631* | (2006.01) |
| *H02G 15/18* | (2006.01) |

(52) U.S. Cl.
CPC ....... *H01R 13/5208* (2013.01); *H01R 13/111* (2013.01); *H01R 13/631* (2013.01); *H02G 1/14* (2013.01); *H02G 15/18* (2013.01)

(58) Field of Classification Search
CPC .................................. H01R 4/00; H01R 13/00
USPC .................................................. 174/88 R, 93
See application file for complete search history.

(56) References Cited

U.S. PATENT DOCUMENTS

| | | | | | |
|---|---|---|---|---|---|
| 3,144,292 | A | * | 8/1964 | Forney, Jr. ......... | H01R 13/6582 439/607.52 |
| 3,377,422 | A | * | 4/1968 | Omer ..................... | H02G 15/18 174/88 R |
| 3,383,642 | A | * | 5/1968 | Nava ...................... | H01R 31/02 439/724 |
| 4,974,075 | A | * | 11/1990 | Nakajima .......... | A61B 1/00124 348/75 |
| 5,998,772 | A | * | 12/1999 | Kirma ................... | B64D 15/12 219/517 |
| 6,069,320 | A | * | 5/2000 | Rocci ...................... | H01R 4/70 174/84 R |
| 6,482,036 | B1 | * | 11/2002 | Broussard ............. | H01R 13/523 439/606 |
| 6,764,350 | B2 | * | 7/2004 | Kosmala ................ | H01R 9/032 439/598 |
| 8,859,899 | B2 | * | 10/2014 | Skrypka ................. | H01R 24/20 174/84 R |

* cited by examiner

*Primary Examiner* — Chau N Nguyen
(74) *Attorney, Agent, or Firm* — Hertzberg, Turk & Associates, LLC

(57) ABSTRACT

Technologies are described for devices and methods to splice two contacts of a cable. The assemblies may comprise a first and second sealing boot each configured to slide onto and form a seal to the cable. The assemblies may comprise a pin contact and a socket contact. A first side of the pin contact may be configured to receive wires from the cable. A second side of the pin contact may be configured to mate with the socket contact. A first side of the socket contact may be configured to receive wires from the cable. A second side of the socket contact may be configured to mate with the pin contact. The assemblies may comprise a housing with a tube shaped body and a grommet at a first and second end. Each grommet may be configured to form a seal to the first sealing boot or the second sealing boot.

18 Claims, 5 Drawing Sheets

100

CONTACT SPLICE

BACKGROUND

Unless otherwise indicated herein, the materials described in this section are not prior art to the claims in this application and are not admitted to be prior art by inclusion in this section.

Network cables transfer data in various environments. Network cables may fail and require repairs. A network cable that has failed may be repaired with a splice. Some network cable splices include a clamshell body and a shrink material.

SUMMARY

One embodiment of the invention is an assembly to splice two contacts of a cable. The assemblies may comprise a first sealing boot configured to slide onto the cable and form a seal to the cable. The assemblies may comprise a second sealing boot configured to slide onto the cable and form a seal to the cable. The assemblies may comprise a pin contact. The pin contact may include a first side and a second side. The first side of the pin contact may be configured to receive wires from the cable and the second side of the pin contact may be configured to mate with a socket contact within a housing. The assemblies may comprise the socket contact. The socket contact may include a first side and a second side. The first side of the socket contact may be configured to receive wires from the cable and the second side of the socket contact may be configured to mate with the pin contact within the housing. The assemblies may comprise the housing. The housing may have a tube shaped body with a first end and a second end. The housing may include a grommet at the first end and a grommet at the second end. Each grommet may be configured to form a seal to the first sealing boot or the second sealing boot.

Another embodiment of the invention includes a contact splice. The contact splice may comprise a first end of a cable and a second end of a cable. The contact splice may comprise a first sealing boot with a first end and a second end. The first end of the first sealing boot may form a seal to the first end of the cable. The second end of the first sealing boot may surround a first side of a pin contact. The contact splice may comprise a second sealing boot with a first end and a second end. The first end of the second sealing boot may form a seal to the second end of the cable. The second end of the second sealing boot may surround a first side of a socket contact. The contact splice may comprise the pin contact. The first side of the pin contact may be crimped to wires from the first end of the cable. A second side of the pin contact may be mated to a second side of the socket contact. The contact splice may comprise the socket contact. The first side of the socket contact may be crimped to wires from the second end of the cable. The second side of the socket contact may be mated to the second side of the pin contact. The contact splice may comprise a housing. The housing may have a tube shaped body with a first end and a second end. The housing may include a grommet at the first end and a grommet at the second end. The grommet at the first end may form a seal to the first sealing boot. The grommet at the second end may form a seal to the second sealing boot. The second end of the pin contact and second end of the socket contact may be connected within the housing.

Another embodiment of the invention is a method to splice a first cable to a second cable. The method may comprise sliding a first end of a first sealing boot over the first cable. The first end of the first sealing boot may form a seal to the first cable. A portion of the first cable may be passed through the first sealing boot. The method may comprise sliding a first end of a second sealing boot over the second cable. The first end of the second sealing boot may form a seal to the second end of the cable. A portion of the second end of the cable may be passed through the second sealing boot. The method may comprise crimping wires from the portion of the first cable passed through the first sealing boot to a first side of the pin contact. The method may comprise crimping wires from the portion of the second cable passed through the second sealing boot to a first side of the socket contact. The method may comprise surrounding at least a portion of the first side of the pin contact with the second side of the first sealing boot. The method may comprise surrounding at least a portion of the first side of the socket contact with the second side of the second sealing boot. The method may comprise inserting the second side of the pin contact into a first end of a housing. The method may comprise inserting the second side of the socket contact into a second end of the housing. The method may comprise connecting the second side of the pin contact to the second side of the socket contact within the housing. The housing may have a tube shaped body. The first end of the housing may form a seal to the first sealing boot. The second end of the housing may form a seal to the second sealing boot.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
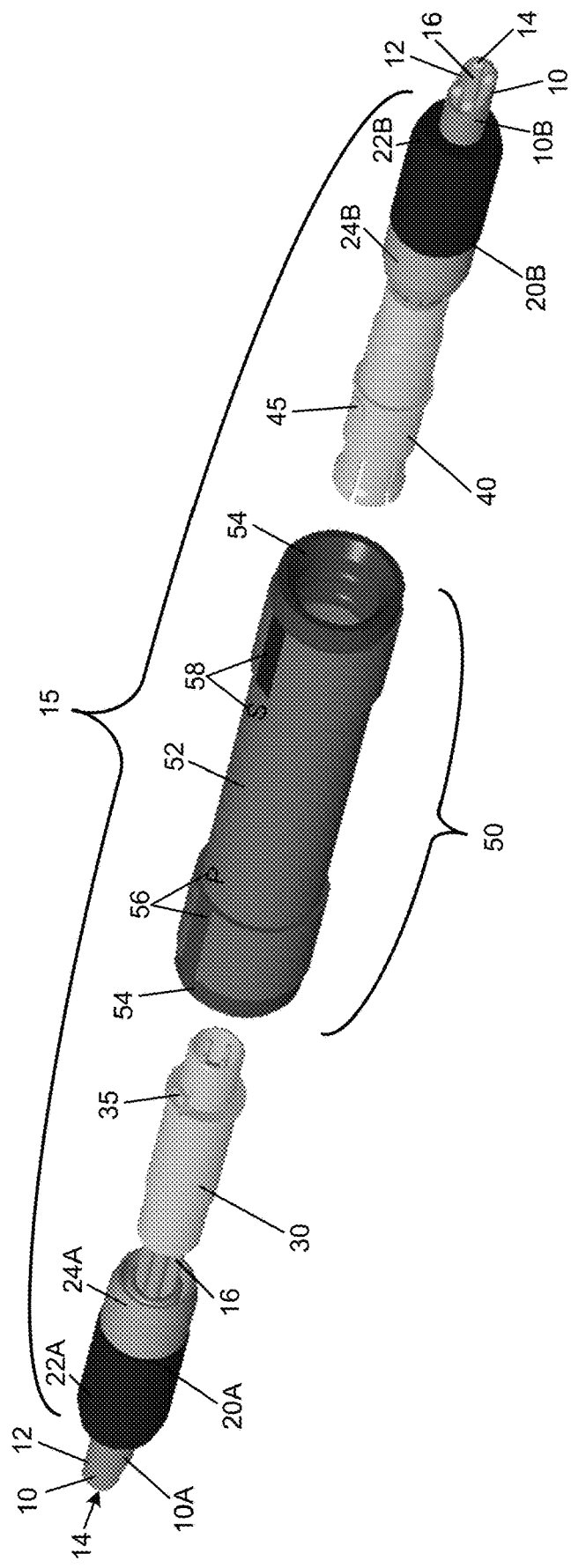
FIG. 1 is a side exploded view of a contact splice.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a side exploded view of a contact splice, arranged in accordance with at least some embodiments described herein. System 100 may include a cable 10 and a contact splice assembly 15. Cable 10 may be an electric or communication cable. Cable 10 may be size 8 and may include 2, 4, or 8 conductor pair wires. Cable 10 may include a first end 10A and a second end 10B. Cable 10 may have an outer protective sheath 12 around wires 14 with respective protective covers 16. Contact splice assembly 15 may include a first sealing boot 20A, a pin contact 30, a housing 50, a socket contact 40, and a second sealing boot 20B.

Contact splice assembly 15 may splice or repair a break in cable 10. Each sealing boot 120A, 20B may be hard plastic and may be configured to slide onto protective sheath 12 of cable 10. Each sealing boot 20A, 20B may form a seal to protective sheath 12 of cable 10. Each sealing boot 20A, 20B may include a first end 22A, 22B and a second end 24A, 24B respectively. First end 22A, 22B may be a different color than second end 24A, 24B. First end 22A, 22B may be configured to receive an end of cable 10. Second end 24A, 24B may be configured to slide over and surround a first side of pin contact 30 and/or a first side of socket contact 40. First end of cable 10A may be inserted into a first side 22A of first sealing boot 20A so that a portion of first end of cable 10A is passed through sealing boot 20A and out second side 24A to allow for crimping of a contact. First sealing boot 20A may form a waterproof environmental seal to first end of cable 10A. Second end of cable 10B may be inserted into a first side 22B of second sealing boot 20B so that a portion of second end of cable 10B is passed through sealing boot 20B and out second side 24B to allow for crimping of a contact. Second sealing boot 20B may form a waterproof environmental seal to second end of cable 10B.

First end of cable 10A, having been passed through sealing boot 20A, may have protective sheath 12 removed, and wires 14 may have respective protective covers 16 removed so as to be inserted and crimped into first side of pin contact 30. First side of pin contact 30 may be configured to receive wires 14. A second side of pin contact 30 may include an alignment key 35. Second side of pin contact 30 may be configured to mate with a second side of socket contact 40.

Second end of cable 10B, having been passed through sealing boot 10B, may have protective sheath 12 removed, and wires 14 may have respective protective covers 16 removed so as to be inserted and crimped into socket contact 40. First side of socket contact 40 may be configured to receive wires 14. A second side of socket contact 40 may include an alignment key 45. Second side of socket contact 40 may be configured to mate with second side of pin contact 30. Second side of pin contact 30 mated with second side of socket contact 40 may form a contact connection or splice between first end of cable 10A and second end of cable 10B.

Housing 50 may be tube shaped. Housing 50 may include a housing body 52, grommets 54, a pin contact alignment mark 56, and a socket contact alignment mark 58. Housing body 52 may be a hard polymer plastic tube with a circular first end and a circular second end. A grommet 54 may be at the first end of housing body 52 and a grommet 54 may be at the second end of housing body 52. Grommets 54 may be a flourosilicone blend and may be tube shaped. A grommet 54 may form a rim at the first end of housing body 52 and a grommet may form a rim at the second end of housing body 52.

Pin contact alignment mark 56 and socket contact alignment mark 58 may be marks such as a line or letter (i.e., P for pin contact 30 and S for socket contact 40) on housing body 52 for aligning alignment key 35 and alignment key 45 of pin contact 30 and socket contact 40 respectively. Pin contact alignment mark 56 and socket contact alignment mark 58 may be color coded with a first color indicating pin contact alignment mark 56 and a second color indicating socket contact alignment mark 58. Second end of pin contact 30 may be inserted into a first side of housing 50 with alignment key 35 lined up with pin contact alignment mark 56. Second end of socket contact 40 may be inserted into a second end of housing 50 with alignment key 45 lined up with socket contact alignment mark 58. Pin contact 30 and socket contact 40 may be connected within housing 50 and may be attached or mated together to splice wires 14 from first end of cable 10A with respective wires 14 from second end or cable 10B.

First sealing boot 20A may be inserted into housing 50 so that second end 24A and at least some of first end 22A are within housing 50 and grommet 54. First sealing boot 20A may be pressure fit into housing 50 at grommet 54. Grommet 54 may form a waterproof environmental seal between housing body 52 and first sealing boot 20A.

Second sealing boot 20B may be inserted into housing 50 so that second end 24B and at least some of first end 22B are within housing 50 and grommet 54. Second sealing boot 20B may be pressure fit into housing 50 at grommet 54. Grommet 54 may form a waterproof environmental seal between housing body 52 and second sealing boot 20B. Contact splice assembly 15 may connect first end of cable 10A with second end of cable 10B while maintaining an environmental seal.

Figure 2:
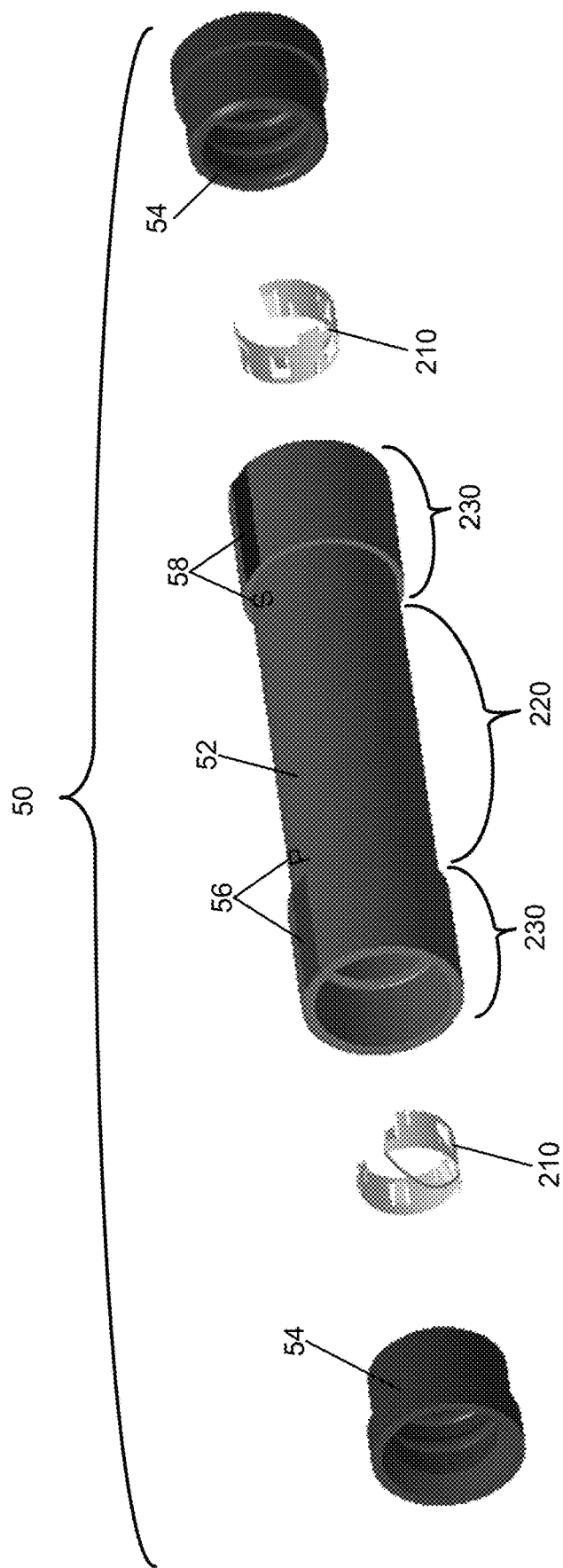
FIG. 2 is a side exploded view of a housing of a contact splice assembly.

FIG. 2 is a side exploded view of a housing of a contact splice assembly, arranged in accordance with at least some embodiments described herein. Those components in FIG. 2 that are labeled identically to components of FIG. 1 will not be described again for the purposes of brevity.

Housing 50 may further include contact clips 210. Contact clips 210 may be beryllium copper. Contact clips 210 may be configured to clip to and secure pin contact 30 and socket contact 40 (shown in FIG. 1) within housing 50. Contact clips 210 may mate with alignment key 35 and alignment key 45 of pin contact 30 and socket contact 40 respectively. Housing body 52 may include a main tube section 220 and two end sections 230. Main tube section 220 may be a tube with a first inner diameter and a first outer diameter. End sections 230 may be tubes with a second inner diameter and a second outer diameter. The second inner diameter of end sections 230 may be larger than the first inner diameter of main tube section 220. The second outer diameter of end sections 230 may be larger than the first outer diameter of main tube section 220. Grommets 54 may be tube shaped and may include a first end with an outer diameter similar in size to the second outer diameter of end sections 230 of housing body 52. Grommets 54 may include a second end with an outer diameter similar in size to the second inner diameter of end sections 230 of housing body 52. Grommet 54 may be securely attached to each end section 230 of housing body 52 with the second end of each grommet within each end section 230 of housing body 52 and the first end of each grommet 54 extending out from an outer end of each end section 230 to form ringed ends of housing 50.

Figure 3:
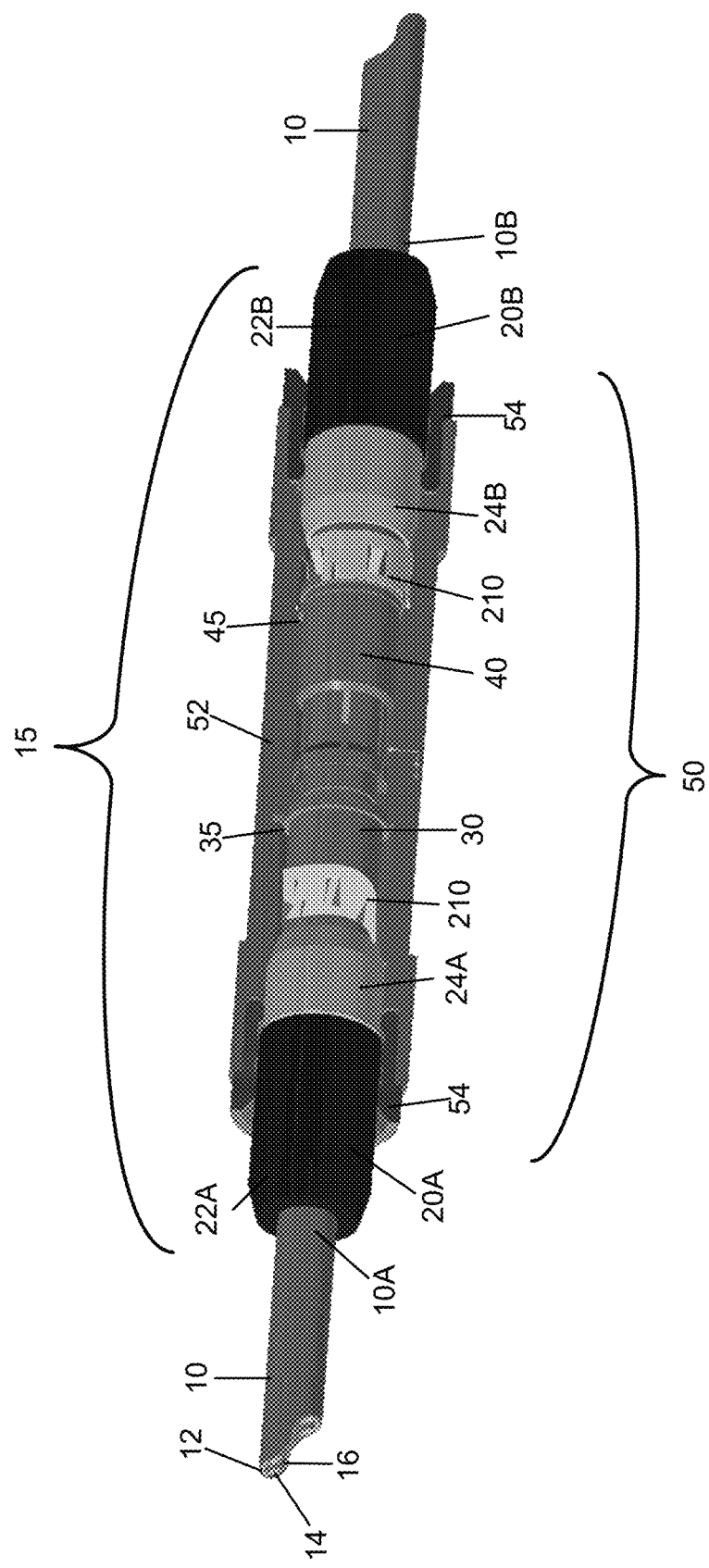
FIG. 3 is a side cutout view of a contact splice.

FIG. 3 is a side cutout view of a contact splice, arranged in accordance with at least some embodiments described herein. Those components in FIG. 3 that are labeled identically to components of FIGS. 1-2 will not be described again for the purposes of brevity.

System 100 may include cable 10 and contact splice assembly 15. First end of cable 10A may pass through sealing boot 10A and insert and crimp into first side of pin contact 30. Second end of cable 10B may pass through sealing boot 10B and insert and crimp into socket contact 40.

Second side of pin contact 30 may mate with second side of socket contact 40. Second side of pin contact 30 in mated with second side of socket contact 40 may form a contact connection or splice between cable ends 10A and 10B. Contact clips 210 may clip and secure pin contact 30 and socket contact 40 within housing 50.

First sealing boot 20A may form a waterproof environmental seal to first end of cable 10A. Second end 24A of first sealing boot 20A may surround at least a portion of first side of pin contact 30. First sealing boot 20A may pressure fit into housing 50 at grommet 54. Grommet 54 may form a waterproof environmental seal between housing body 52 and first sealing boot 20A.

Second sealing boot 20B form a waterproof environmental seal to second end of cable 10B. Second end 24B of second sealing boot 20B may surround at least a portion of first side of socket contact 40. Second sealing boot 20B may pressure fit into housing 50 at grommet 54. Grommet 54 may form a waterproof environmental seal between housing body 52 and second sealing boot 20B. Contact splice assembly 15 may connect first end of cable 10A with second end of cable 10B while maintaining an environmental seal.

Figure 4:
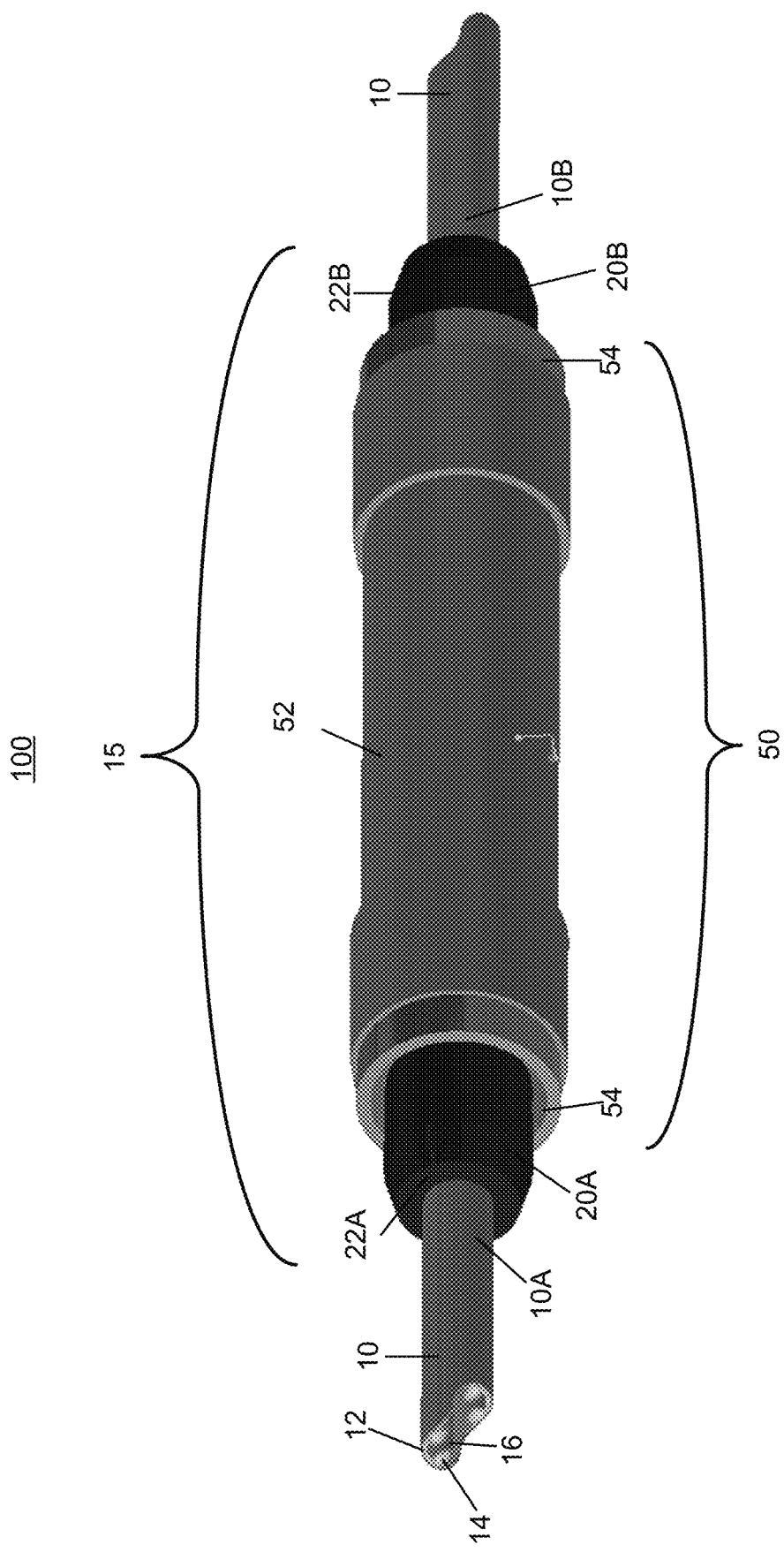
FIG. 4 is a side view of a contact splice.

FIG. 4 is a side view of a contact splice, arranged in accordance with at least some embodiments described herein. Those components in FIG. 4 that are labeled identically to components of FIGS. 1-3 will not be described again for the purposes of brevity.

Contact splice assembly 15 may connect first end of cable 10A with second end of cable 10B while maintaining an environmental seal between sealing boot 20A and first end of cable 10A, sealing boot 20B and second end of cable 10B, as well as maintaining an environmental seal between sealing boots 20A, 20B and grommets 54 of housing 50. As shown in FIG. 4, when a contact splice is completed with contact splice assembly 15, protective sheath 12 of cable 10, sealing boots 20A, 20B, grommets 54, and housing body 50 may be exposed to environmental conditions. A spliced connection between cable ends 10A and 10B may be protected from environmental conditions within housing 50.

A device in accordance with the present disclosure may provide a contact splice that is easy to install. A device in accordance with the present disclosure may provide a contact splice while maintaining an environmental seal. A device in accordance with the present disclosure may provide a contact splice that can withstand water pressure. A device in accordance with the present disclosure may provide a contact splice that can maintain an environmental seal without requiring a shrink material. A device in accordance with the present disclosure may provide a contact splice that can maintain an environmental seal without requiring a heat shrinking of a housing. A device in accordance with the present disclosure may provide a contact splice with pressure fittings on the ends of the splice.

Figure 5:
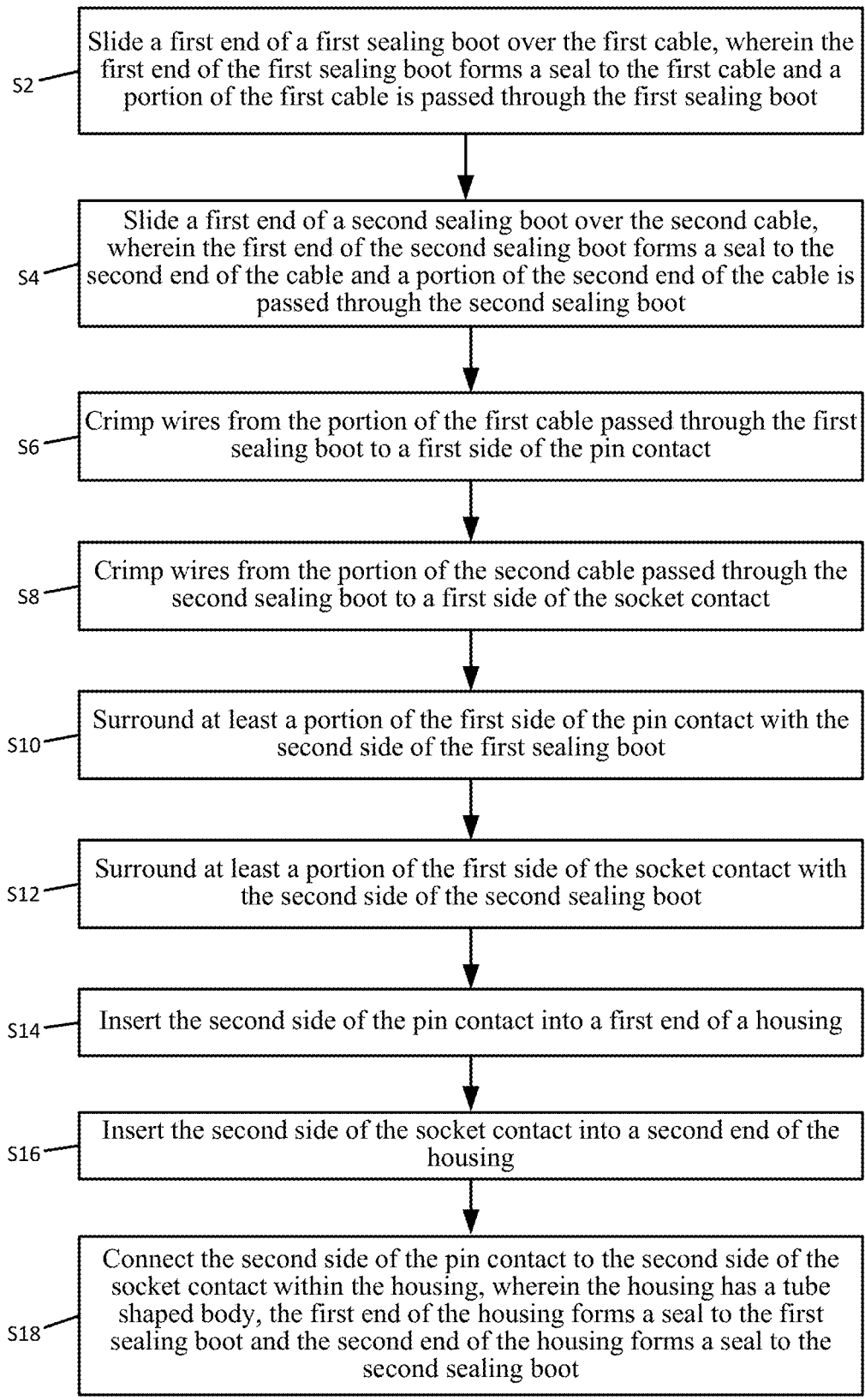
FIG. 5 illustrates a flow diagram for an example process to splice a contact, all arranged according to at least some embodiments described herein.

FIG. 5 illustrates a flow diagram for an example process to splice a contact, arranged in accordance with at least some embodiments presented herein. An example process may include one or more operations, actions, or functions as illustrated by one or more of blocks S2, S4, S6, S8, S10, S12, S14, S16 and/or S18. Although illustrated as discrete blocks, various blocks may be divided into additional blocks, combined into fewer blocks, or eliminated, depending on the desired implementation.

Processing may begin at block S2, "Slide a first end of a first sealing boot over the first cable, wherein the first end of the first sealing boot forms a seal to the first cable and a portion of the first cable is passed through the first sealing boot". At block S2, a first end of a first sealing boot may be slid over the first cable. The first end of the first sealing boot may form a seal to the first cable. A portion of the first cable may be passed through the first sealing boot. The first end of the first sealing boot may form a waterproof seal to the first cable.

Processing may continue from block S2 to block S4, "Slide a first end of a second sealing boot over the second cable, wherein the first end of the second sealing boot forms a seal to the second end of the cable and a portion of the second end of the cable is passed through the second sealing boot". At block S4, the first end of a second sealing boot may be slid over the second cable. The first end of the second sealing boot may form a seal to the second cable. A portion of the second cable may be passed through the second sealing boot. The second end of the second sealing boot may form a waterproof seal to the second cable.

Processing may continue from block S4 to block S6, "Crimp wires from the portion of the first cable passed through the first sealing boot to a first side of the pin contact". At block S6, wires from the portion of the first cable passed through the first sealing boot may be crimped to a first side of the pin contact.

Processing may continue from block S6 to block S8, "Crimp wires from the portion of the second cable passed through the second sealing boot to a first side of the socket contact". At block S8, wires from the portion of the second cable passed through the second sealing boot may be crimped to a first side of the socket contact.

Processing may continue from block S8 to block S10, "Surround at least a portion of the first side of the pin contact with the second side of the first sealing boot". At block S10, at least a portion of the first side of the pin contact may be surrounded by the second side of the first sealing boot.

Processing may continue from block S10 to block S12, "Surround at least a portion of the first side of the socket contact with the second side of the second sealing boot". At block S12, at least a portion of the first side of the socket contact may be surrounded by the second side of the second sealing boot.

Processing may continue from block S12 to block S14, "Insert the second side of the pin contact into a first end of a housing". At block S14, the second side of the pin contact may be inserted into a first end of a housing. An alignment key on the pin contact may be aligned with a pin contact alignment mark on the first end of the housing.

Processing may continue from block S14 to block S16, "Insert the second side of the socket contact into a second end of the housing". At block S16, the second side of the socket contact may be inserted into a second end of the housing. An alignment key on the socket contact may be aligned with a socket contact alignment mark on the second end of the housing.

Processing may continue from block S16 to block S18, "Connect the second side of the pin contact to the second side of the socket contact within the housing, wherein the housing has a tube shaped body, the first end of the housing forms a seal to the first sealing boot and the second end of the housing forms a seal to the second sealing boot". At block S18, the second side of the pin contact may be connected to the second side of the socket contact within the housing. The housing may have a tube shaped body. The first end of the housing may form a seal to the first sealing boot and the second end of the housing may form a seal to the second sealing boot.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An assembly to splice two contacts of a cable, the assembly comprising:
    a first sealing boot configured to slide onto the cable and form a seal to the cable;
    a second sealing boot configured to slide onto the cable and form a seal to the cable;
    a pin contact, wherein the pin contact includes a first side and a second side, the first side of the pin contact configured to receive wires from the cable and the second side of the pin contact configured to mate with a socket contact within a housing;
    the socket contact, wherein the socket contact includes a first side and a second side, the first side of the socket contact configured to receive wires from the cable and the second side of the socket contact configured to mate with the pin contact within the housing; and
    the housing, wherein the housing has a tube shaped body with a first end and a second end, the housing includes a pin contact alignment mark, a socket contact alignment mark, a grommet at the first end, and a grommet at the second end, and each grommet is configured to form a seal to the first sealing boot or the second sealing boot.

2. The assembly of claim 1, wherein the first sealing boot is configured to form a waterproof seal to the cable, the second sealing boot is configured to form a waterproof seal to the cable, and each grommet is configured to form a waterproof seal to the first sealing boot or the second sealing boot.

3. The assembly of claim 1, wherein the grommets are a fluorosilicone blend.

4. The assembly of claim 1, wherein the pin contact includes an alignment key and the socket contact includes an alignment key.

5. The assembly of claim 1, wherein the housing includes contact clips to secure the pin contact and the socket contact within the housing.

6. The assembly of claim 1, wherein the pin contact includes an alignment key, the socket contact includes an alignment key, and the housing includes contact clips to secure the pin contact and the socket contact within the housing.

7. The assembly of claim 1, wherein the grommets are a fluorosilicone blend, each grommet is configured to form a waterproof seal to the first sealing boot or the second sealing boot, the first sealing boot is configured to form a waterproof seal to the cable, the second sealing boot is configured to form a waterproof seal to the cable, the pin contact includes an alignment key, the socket contact includes an alignment key, the housing includes contact clips to secure the pin contact and the socket contact within the housing, and the cable is size 8.

8. A contact splice, the contact splice comprising:
    a first end of a cable;
    a second end of a cable;
    a first sealing boot with a first end and a second end, the first end of the first sealing boot forms a seal to the first end of the cable, the second end of the first sealing boot surrounds a first side of a pin contact;
    a second sealing boot with a first end and a second end, the first end of the second sealing boot forms a seal to the second end of the cable, the second end of the second sealing boot surrounds a first side of a socket contact;
    the pin contact, wherein the first side of the pin contact is crimped to wires from the first end of the cable, and a second side of the pin contact is mated to a second side of the socket contact;
    the socket contact, wherein the first side of the socket contact is crimped to wires from the second end of the cable and the second side of the socket contact is mated to the second side of the pin contact; and
    a housing, wherein the housing has a tube shaped body with a first end and a second end, the housing includes a pin contact alignment mark, a socket contact alignment mark, a grommet at the first end, and a grommet at the second end, the grommet at the first end forms a seal to the first sealing boot, the grommet at the second end forms a seal to the second sealing boot, and the second end of the pin contact and second end of the socket contact are connected within the housing.

9. The splice of claim 8, wherein the first sealing boot forms a waterproof seal to the cable, the second sealing boot forms a waterproof seal to the cable, the grommet at the first end forms a waterproof seal to the first sealing boot, and the grommet at the second end forms a waterproof seal to the second sealing boot.

10. The splice of claim 8, wherein the grommets are a fluorosilicone blend.

11. The splice of claim 8, wherein the pin contact includes an alignment key and the socket contact includes an alignment key.

12. The splice of claim 8, wherein the housing includes contact clips to secure the pin contact and the socket contact within the housing.

13. The splice of claim 8, wherein the grommets are a fluorosilicone blend, the grommet at the first end forms a waterproof seal to the first sealing boot, and the grommet at the second end forms a waterproof seal to the second sealing boot, the first sealing boot forms a waterproof seal to the cable, the second sealing boot forms a waterproof seal to the cable, the pin contact includes an alignment key, the socket contact includes an alignment key, the housing includes contact clips to secure the pin contact and the socket contact within the housing, and the cable is size 8.

14. A method to splice a first cable to a second cable, the method comprising:
    sliding a first end of a first sealing boot over the first cable, wherein the first end of the first sealing boot forms a seal to the first cable and a portion of the first cable is passed through the first sealing boot;
    sliding a first end of a second sealing boot over the second cable, wherein the first end of the second sealing boot forms a seal to the second end of the cable and a portion of the second end of the cable is passed through the second sealing boot;
    crimping wires from the portion of the first cable passed through the first sealing boot to a first side of a pin contact;

crimping wires from the portion of the second cable passed through the second sealing boot to a first side of a socket contact;

surrounding at least a portion of the first side of the pin contact with a second end of the first sealing boot;

surrounding at least a portion of the first side of the socket contact with a second end of the second sealing boot;

inserting a second side of the pin contact into a first end of a housing by aligning a pin alignment key on the second side of the pin contact with a first alignment mark on the first end of the housing;

inserting a second side of the socket contact into a second end of the housing by aligning a socket alignment key on the second side of the socket contact with a second alignment mark on the second end of the housing; and connecting the second side of the pin contact to the second side of the socket contact within the housing, wherein the housing has a tube shaped body, the first end of the housing forms a seal to the first sealing boot and the second end of the housing forms a seal to the second sealing boot.

15. The method of claim 14, wherein inserting the second side of the pin contact into the first end of the housing and inserting the second side of the socket contact into the second end of the housing further comprises:

inserting the second side of the pin contact into the first end of the housing with the pin alignment key aligned with the first alignment mark; and inserting the second side of the socket contact into the second end of the housing with the socket alignment key aligned with the second alignment mark.

16. The method of claim 14, wherein the first sealing boot forms a waterproof seal to the cable, the second sealing boot forms a waterproof seal to the cable, the housing includes a grommet at the first end and a grommet at the second end, the grommet at the first end forms a waterproof seal to the first sealing boot, and the grommet at the second end forms a waterproof seal to the second sealing boot.

17. The method of claim 16, wherein the grommets are a fluorosilicone blend.

18. The method of claim 14, wherein the housing includes contact clips to secure the pin contact and the socket contact within the housing.

\* \* \* \* \*